(12) United States Patent
Shimizu

(10) Patent No.: US 7,744,425 B2
(45) Date of Patent: Jun. 29, 2010

(54) ELECTRONIC PART EQUIPPED UNIT

(75) Inventor: Tomohiko Shimizu, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/170,754

(22) Filed: Jul. 10, 2008

(65) Prior Publication Data

US 2009/0017653 A1     Jan. 15, 2009

(30) Foreign Application Priority Data

Jul. 11, 2007   (JP) .............................. 2007-182311

(51) Int. Cl.
*H01R 9/03*   (2006.01)
(52) U.S. Cl. .................................................... 439/658
(58) Field of Classification Search .................. 439/95, 439/620.01, 620.21, 620.22, 620.09, 404, 439/658, 925, 701, 721, 76.2, 949, 417, 620.26
See application file for complete search history.

(56) References Cited

U.S. PATENT DOCUMENTS 7,252,551 B2 *   8/2007   Ueno et al. ............ 439/620.21
7,297,029 B2 *   11/2007  Ueno et al. ............ 439/620.21
2005/0118874 A1 *   6/2005   Lin ............................. 439/620
2006/0073738 A1 *   4/2006   Nagaoka et al. ............. 439/721

FOREIGN PATENT DOCUMENTS

JP     2006-109587 A     4/2006

* cited by examiner

*Primary Examiner*—Edwin A. Leon
(74) *Attorney, Agent, or Firm*—Sughrue Mion, PLLC

(57) ABSTRACT

An electronic part equipped unit includes a case body having a first recess portion for containing an electronic part and a second recess portion for containing a relay terminal and a ground terminal which are connected to the electronic part through leads, a wire side terminal to which a middle portion of a wire is attached, a cover member to which the wire side terminal is attached, and a shortcircuit preventing cover that covers a bottom wall and a side wall of the case body at a position corresponding to the second recess portion. The wire side terminal is brought into contact with the relay terminal when the cover member to which the wire side terminal is attached is fitted to the second recess portion of the case body.

4 Claims, 5 Drawing Sheets

ELECTRONIC PART EQUIPPED UNIT

BACKGROUND

The present invention relates to an electronic part equipped unit including an electronic part at inside of a case body and attached to a middle portion of a wire.

For example, in various sensors mounted to an automobile or the like, noise from a noise source having a high frequency component, such as a horn or a wire, and external noise from a neon sign or the like, an induction noise or the like are conducted to the sensors through a wire, and there is a concern of bringing about an erroneous operation thereby. In order to remove the noise, development of an electronic part equipped unit (noise prevention piece) has been promoted.

In FIG. 9, a reference 1 designates a wire. Further, a reference 2 designates an electronic part equipped unit connected to a middle portion 3 of the wire 1. The electronic part equipped unit 2 includes a case body 4 having an electronic part containing recess portion and a fitting connection recess portion, a containing recess portion cover 6 consecutively aligned to the case body 4 by way of a hinge 5 for covering the electronic part containing recess portion, a resin locking portion 7 formed at the containing recess portion cover 6 and locked to an attaching counter party, an electronic part 9 which is contained in the electronic part containing recess portion and in which a pair of leads 8a and 8b are extended to the fitting connection recess portion, a relay terminal 10 brought into contact with the lead 8a on one side, a ground terminal 12 made of a metal which is brought into contact with the lead 8b on other side and in which a portion projected from the fitting connection recess portion is formed as a ground portion 11, and a cover attached wire 15 which includes a wire side terminal 13 and a cover member 14 and attached to the middle portion of the wire 1 and in which the wire side terminal 13 is brought into contact with the relay terminal 10 and the cover member 14 is fitted to the fitting connection recess portion.

In the electronic part equipped unit 2, the fitting connection recess portion and the cover member 14 fitted thereto are disposed between the resin locking portion 7 and the ground portion 11. The cover member 14 and the fitting connection recess portion are fitted to each other with a cover side fitting portion 16 and a projected locking portion 17.

When the electronic part equipped unit 2 is attached to a vehicle, first, the resin locking portion 7 is inserted to a seat face made of a metal of an attaching counter party to be provisionally fixed, next, the ground portion 11 of the ground terminal 12 is fastened by a screw to connect to thereby finish fixing a total thereof.

Further, as a technology with regard to the electronic part equipped unit 2, for example, a disclosed technology of Patent Reference 1 is described below.

[Patent Reference 1] JP-A-2006-109587

Meanwhile, according to the electronic part equipped unit 2, in order to stabilize a state of connecting the one lead 8a of the electronic part 9 and the relay terminal 10, further, in order to stabilize a state of connecting the other lead 8b of the electronic part 9 and the ground terminal 12, it is conceived preferable to apply welding. Although it is necessary to form a through hole for welding (welding hole) at the bottom wall of the case body 4 at a position of the fitting connection recess portion, the welding hole is not needed after welding to stay to be opened. Therefore, there poses a problem that after attaching the electronic part equipped unit 2 to a vehicle, when a foreign matter having a conductivity is brought into contact with the welded portion and a seat face made of a metal of the vehicle, shortcircuit is brought about.

SUMMARY

The invention has been carried out in view of the above-described situation and it is a problem thereof to provide an electronic part equipped unit having a shortcircuit preventing function.

In order to achieve the above object, according to the present invention, there is provided an electronic part equipped unit, comprising:
  a case body that includes a first recess portion for containing an electronic part and a second recess portion for containing a relay terminal and a ground terminal which are connected to the electronic part through leads;
  a wire side terminal to which a middle portion of a wire is attached;
  a cover member to which the wire side terminal is attached; and
  a shortcircuit preventing cover that covers a bottom wall and a side wall of the case body at a position corresponding to the second recess portion,
  wherein the wire side terminal is brought into contact with the relay terminal when the cover member to which the wire side terminal is attached is fitted to the second recess portion of the case body.

According to the above configuration, even when a through hole communicated with an inner portion of the fitting connection recess portion is present at the case body, the through hole is covered by the shortcircuit preventing cover and is shut off from outside. Therefore, a foreign matter having a conductivity is not brought to the through hole after attaching the electronic part equipped unit, as a result, a drawback of shortcircuit is not brought about.

Preferably, the shortcircuit preventing cover includes an inserting portion which passes through the side wall of the case body, and covers a connecting portion in which one of the leads is connected to the ground terminal. A portion of the shortcircuit preventing cover opposed to the bottom wall covers a welding hole formed at the bottom wall of the case body.

According to the above configuration, the inserting portion of the shortcircuit preventing cover is inserted to the fitting connection recess portion to cover the connecting portion of the lead of the electronic part and the ground terminal, and therefore, even when a foreign matter is existed at an inner portion of the fitting connection recess portion, a drawback owing to the connected portion is prevented from being brought about. Further, according to the invention, the portion of the shortcircuit preventing cover opposed to the bottom wall covers the welding hole formed at the bottom wall, and therefore, the foreign matter is not brought to the inner portion of the fitting connection recess portion by way of the welding hole.

According to the invention, an advantage of capable of preventing shortcircuit at inside and outside of the fitting connection recess portion is achieved by covering the case body by the shortcircuit preventing cover.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Figure 1:
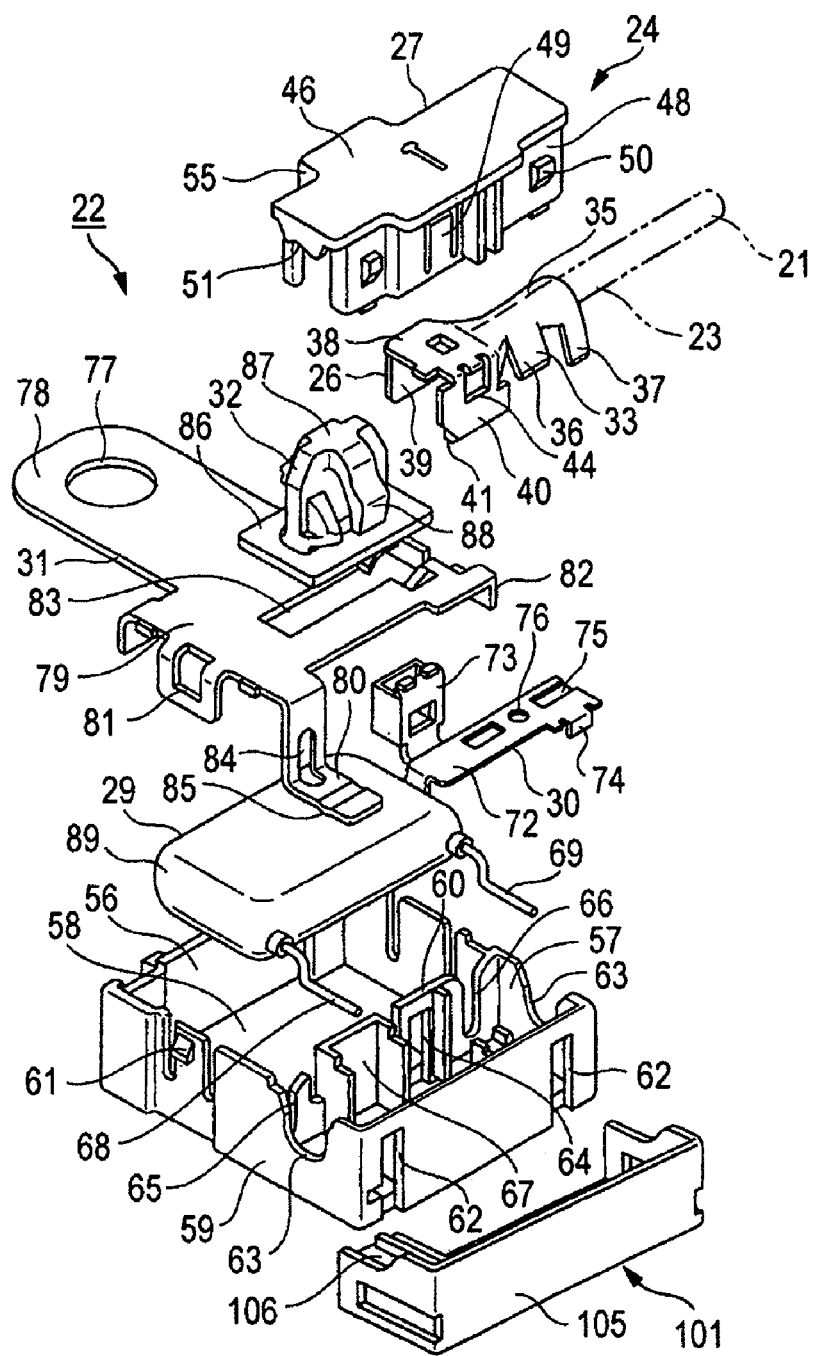
FIG. 1 is a disassembled perspective view showing an electronic part equipped unit according to an embodiment of the invention.
Figure 2:
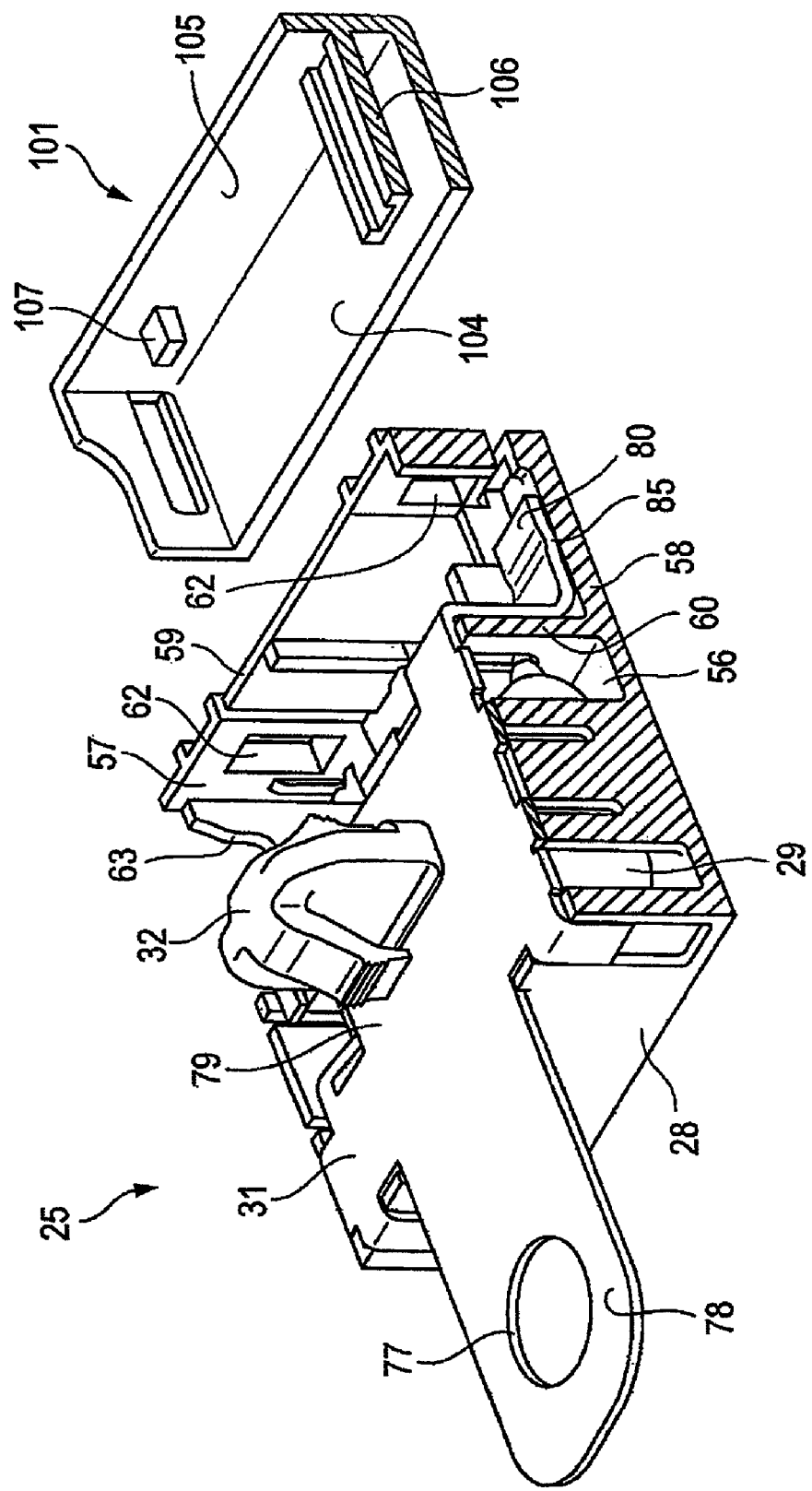
FIG. 2 is a perspective view showing a state before a shortcircuit preventing cover is attached (including a sectional view. A view of a cover attached wire is omitted)
Figure 3:
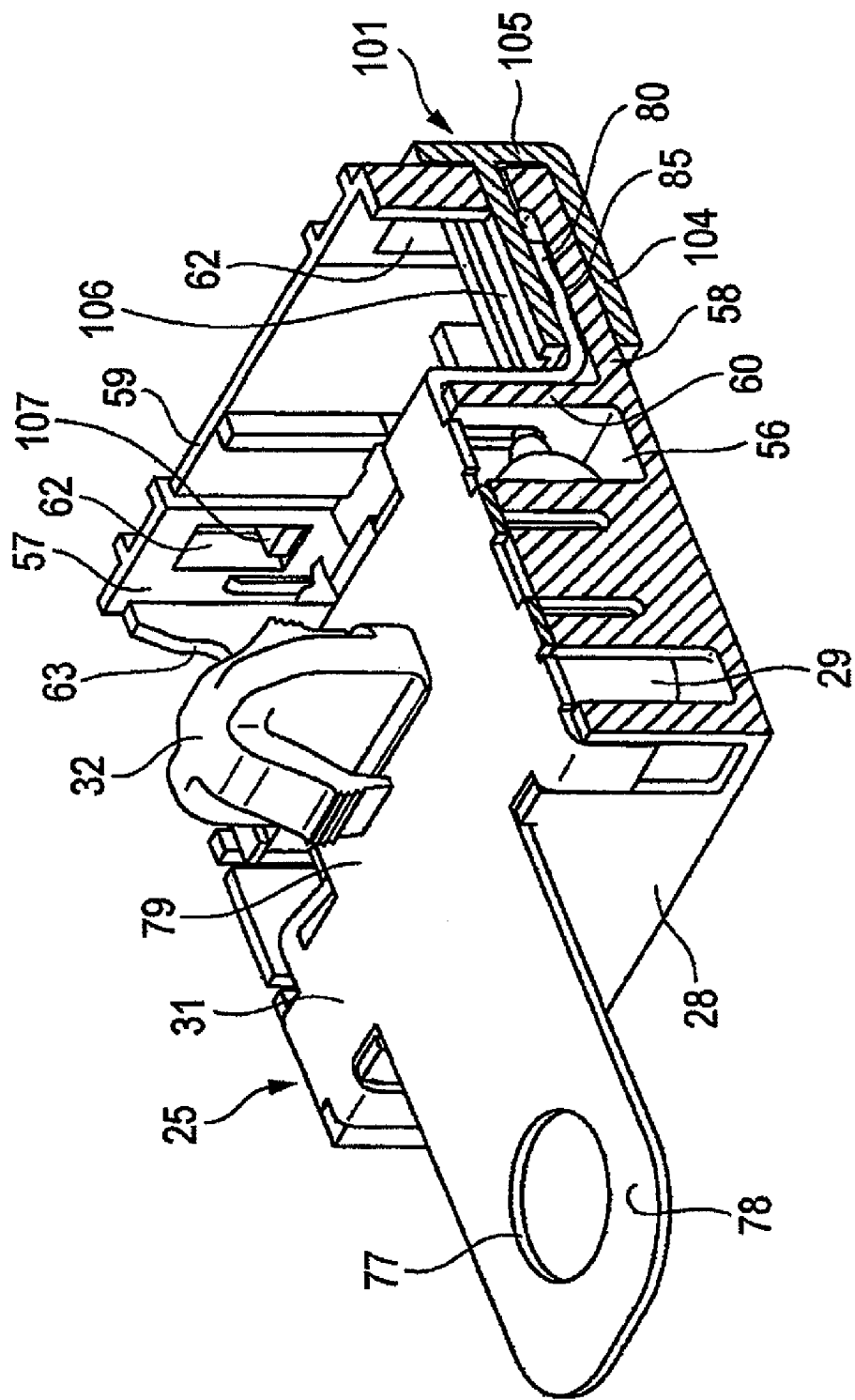
FIG. 3 is a perspective view showing a state when the shortcircuit preventing cover is attached (including a sectional view. A view of the cover attached wire is omitted)
Figure 4:
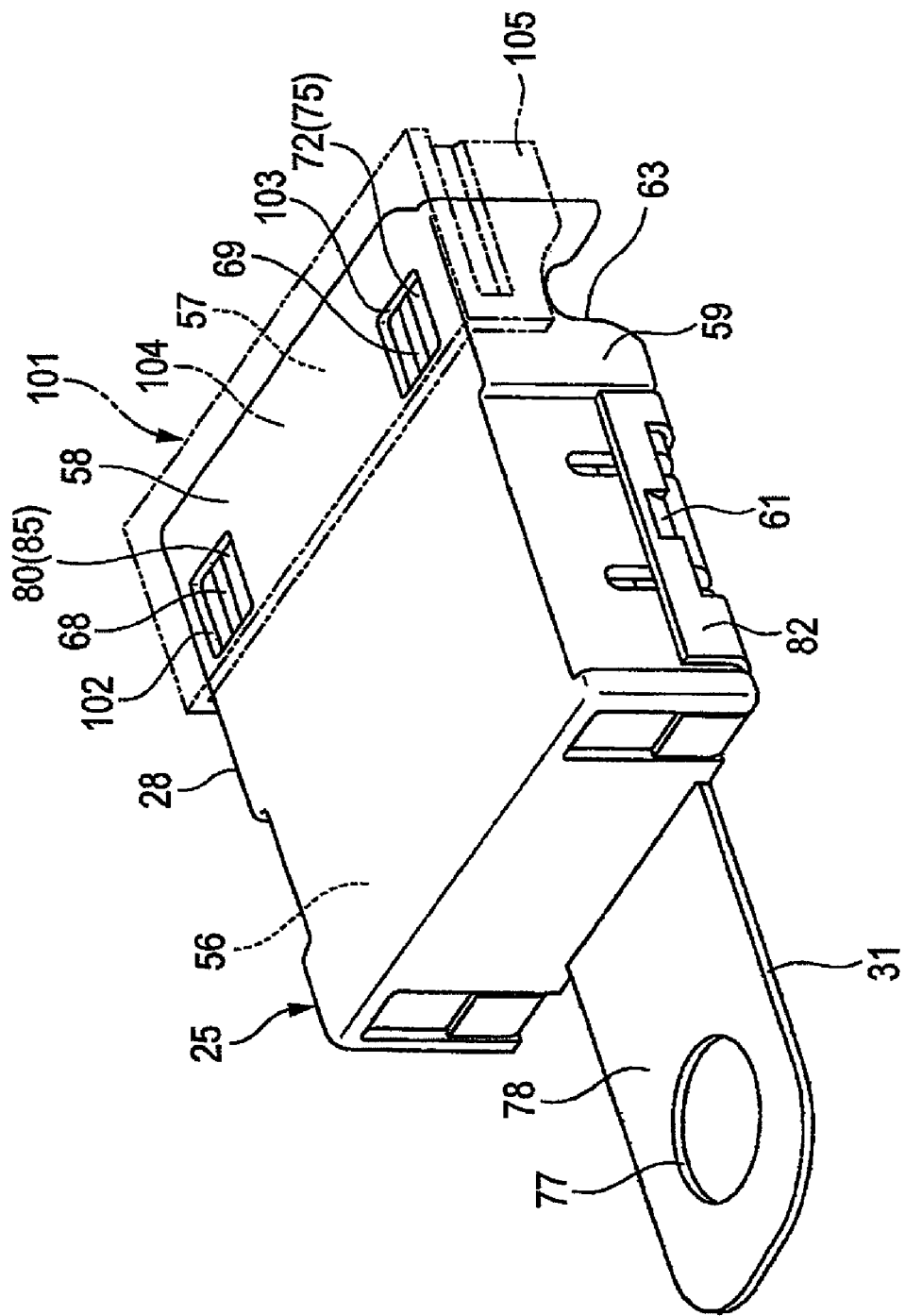
FIG. 4 is a perspective view showing the shortcircuit preventing cover in view from a side of a case bottom wall (a view of a cover attached wire is omitted)

An explanation will be given in reference to the drawings as follows. FIG. 1 is a disassembled perspective view showing an electronic part equipped unit according to an embodiment of the invention. Further, FIG. 2 is a perspective view showing a state before a shortcircuit preventing cover is attached, FIG. 3 is a perspective view showing a state when the shortcircuit preventing cover is attached, and FIG. 4 is a perspective view showing the shortcircuit preventing cover in view from a side of a case bottom wall. Further, FIG. 2 through FIG. 4 omits a view of a cover attached wire for convenience of explanation.

Figure 5:
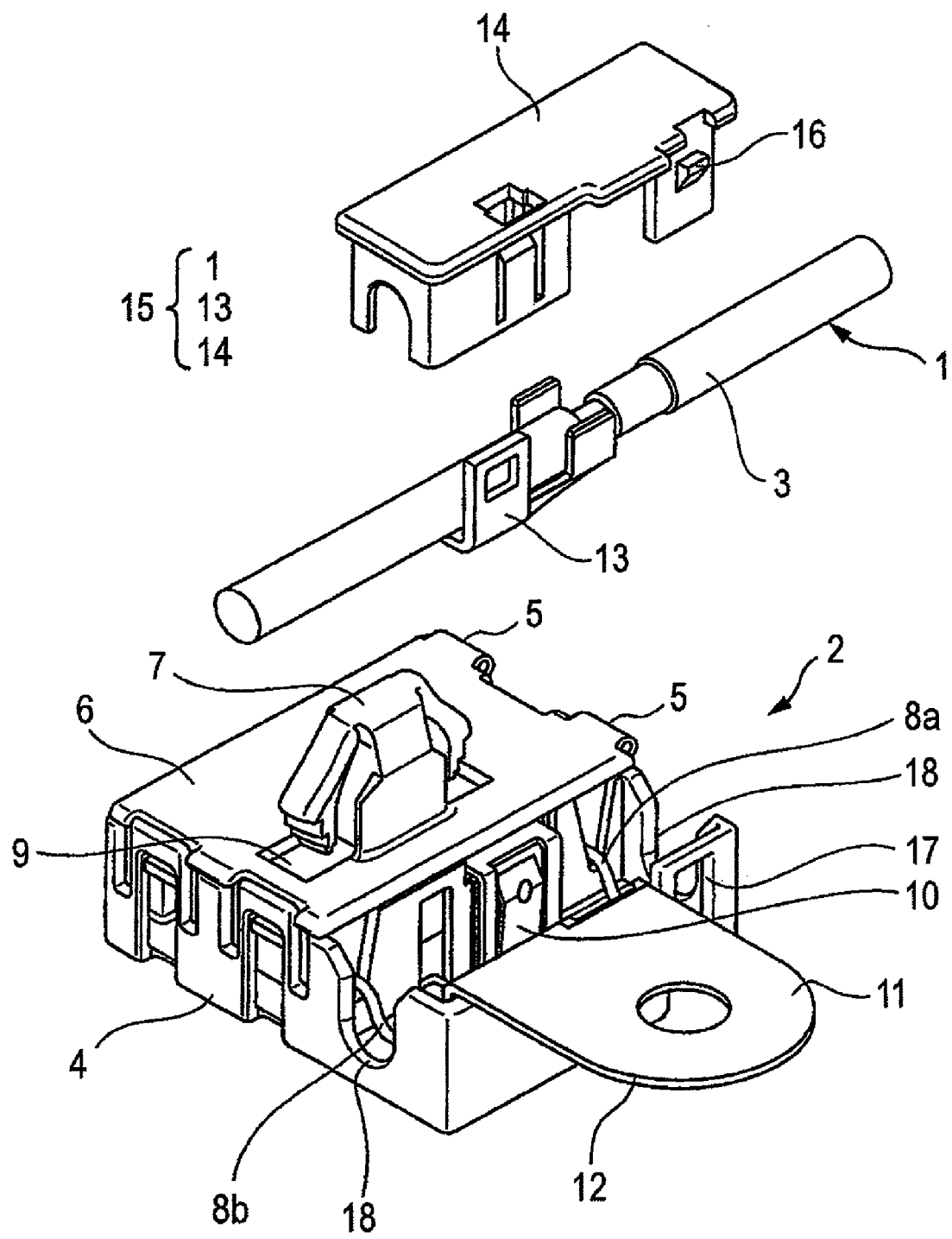
FIG. 5 is a disassembled perspective view of an electronic part equipped unit of a related art.

In FIG. 1, reference number 21 designates a wire (the same as the wire 1 of FIG. 5). Further, reference number 22 designates an electronic part equipped unit connected to a middle portion 23 of the wire 21. The electronic part equipped unit 22 includes a cover attached wire 24 which is attached to the middle portion 23 of the wire 21 previously, a unit main body 25 electrically connected and fitted to the cover attached wire 24, and a shortcircuit preventing cover 101 which is attached to the unit main body 25 at a later stage.

The cover attached wire 24 includes a wire side terminal 26 and a cover member 27 in addition to the wire 21. Further, the unit main body 25 fitted with the cover attached wire 24 includes a case body 28, an electronic part 29, a relay terminal 30, a ground terminal 31, and a clamp 32. The shortcircuit preventing cover 101 is a part of a single member in the embodiment constituting a characteristic of the invention. The respective constitutions will be explained as follows (an explanation will be given of integration after explaining the constitution).

In explaining the embodiment, the wire 21 is arranged to a vehicle or the like although not particularly limited (applicable also to other than a vehicle). Further, the electronic part equipped unit 22 is locked by and fixed to a predetermined seat face of a vehicle body.

The wire 21 is one piece of a plurality of wires constituting a wire harness or a single wire, and has a conductor and an insulating cover portion covering the conductor. The middle portion 23 of the wire 21 is electrically connected to the wire side terminal 26.

The wire side terminal 26 includes a metal having a conductivity and includes a wire connecting portion 33 directly connected to the conductor, and an electric contact portion 34 continuous to a front side of the wire connecting portion 33. A reference 35 designates a bottom portion (bottom) of the wire side terminal 26. The wire connecting portion 33 includes a pair of conductor fastening pieces 36 for fastening the conductor exposed by peeling a sheath of the middle portion 23 of the wire 21, and a pair of cover fastening portions 37 for fastening the cover portion.

The electric contact portion 34 includes a base portion 38, a connection tab 39 consecutively aligned to one side portion of the base portion 38, a locking portion 40 consecutively aligned to other side portion of the base portion 38, and a rib contact portion 41 consecutively aligned to the locking portion 40. The electric contact portion 34 is formed by a folding process. The base portion 38, the connection tab 39 and the locking portion 40 are formed in a U shape by the folding process. The wire 21 is passed through a portion between the connection tab 39 and the locking portion 40.

The rib contact portion 41 is continuous to the locking portion 40 by the folding process. Also, the rib contact portion 41 is formed so as to be parallel to the base portion 38. The rib contact portion has a width so that an operator does not feel a pain at the finger when the rib contact portion is pushed by the finger.

The locking portion 40 has a locking hole 44 for locking. The locking hole 44 is formed so as to prevent the wire side terminal 26 from being detached from the cover member 27. The connection tab 39 is constituted by a tab-like shape and is formed as a portion of carrying out an electric connection by being inserted to the relay terminal 30 of the unit main body 25.

The wire side terminal 26 is inserted to inside of the cover member 27 from a side of the bottom portion 35 of the wire side terminal 26 in a state that the wire side terminal 26 is connected to the middle portion 23 of the wire 21. Further, when the wire side terminal 26 is locked by the cover member 27, the wire side terminal 26 is made not to be detached therefrom. The wire side terminal 26 is easily inserted to inside of the cover member 27 by pushing the rib contact portion 41 toward the cover member 27 by the finger of the operator.

The cover member 27 is made of an insulating synthetic resin and is formed so as to have a shape for locking the wire side terminal 26 and fitting to the case body 28 of the unit main body 25. The cover member 27 includes a ceiling wall 46 and side walls continuous to the ceiling wall 46. With regard to the side wall, an inner side of the side walls are formed to constitute a wire containing portion 47. Further, with regard to the side walls, an outer side thereof (side walls per se) is formed to constitute a case body inserting guide portion 48 functioning as a guide when the cover member 27 is inserted to the case body 28.

Also, the one side wall is formed with a locking projection 49 in an arm-like shape having a flexibility. Further, the side walls are formed with a plurality of cover side fitting portions 50 substantially in a projected shape. The locking projection 49 is formed to lock the wire side terminal 26 inserted to inside of the cover member 27. The cover side locking portion 50 is formed to fit to the case body 28.

Further, the side wall is formed with a pair of wire support portions 51 in a U-like shape for supporting the wire 21 in a press fit state (although the wire 21 is preferably supported in the press fit state, the other structure will do so far as the structure can maintain a horizontal state of the wire 21 when the cover member 27 is attached. The structure is preferably contributes to prevent bending, skewed insertion or the like of the wire 21). Further, the side wall is formed with a protruding portion 55 in correspondence with the connection tab 39 of the wire side terminal 26.

The case body 28 of the unit main body 25 is made of an insulating synthetic resin and includes an electronic part containing recess portion 56 and a fitting connection recess portion 57 contiguous to the electronic part containing recess portion 56. The electronic part containing recess portion 56 and the fitting connection recess portion 57 are formed by being surrounded by a bottom wall 58, a side wall 59 formed at an edge portion of the bottom wall 58, and a partition wall 60. The electronic part containing recess portion 56 is formed as a portion in a recess shape for containing the electronic part 29. The fitting connection recess portion 57 is formed as a portion in a recess shape fitted with the cover attached wire 24 to carry out electric connection. The electronic part containing recess portion 56 and the fitting connection recess portion 57 are partitioned by the partition wall 60.

The side wall 59 is formed with a locking projection 61 and a projection locking portion 62. Further, the side wall 59 is formed with a pair of wire support portions 63. The projection locking portion 62 is formed as a portion for fitting the cover attached wire 24. Further, the projection locking portion 62 has a hole so that a portion of the shortcircuit preventing cover 101 is inserted to inside of the fitting connection recess portion 57. The projection locking portion 62 is formed so as to extend in an up and down direction.

The pair of wire support portions 63 are formed by being notched in a U-like shape at portions of the fitting connection recess portion 57. The pair of wire support portions 63 are formed to be able to be inserted with the wire 21 to support the wire 21 in fitting the cover attached wire 24.

The partition wall 60 is formed with a projection locking portion 64, lead support portions 65, 66, a protruding portion 67. The projection locking portion 64 is formed as a portion of fitting the cover attached wire 24. The lead support portions 65, 66 are formed for supporting leads 68, 69 of the electronic part 29 contained in the electronic part containing recess portion 56 and extended to the fitting connection recess portion 57. The lead support portions 65, 66 are formed in a slit-like shape.

The bottom wall 58 has welding holes 102, 103 (refer to FIG. 4) penetrated to the fitting connection recess portion 57. The welding holes 102, 103 are formed to weld the lead 69 of the electronic part 29 and a welding portion 75 mentioned later of the relay terminal 30 and for welding the lead 68 of the electronic part 29 and a welding portion 85 mentioned later of the ground terminal 31.

The relay terminal 30 includes a fixed board portion 72 in a shape of a bus bar comprising a metal having a conductivity and a tab connecting portion 73 consecutively aligned at one side portion of the fixed board portion 72 and inserted with the connection tab 39 of the wire side terminal 26. The fixed board portion 72 is formed to be mounted to and fixed by the bottom (bottom wall 58) of the fitting connection recess portion 57.

The fixed board portion 72 is formed with a plurality of fixing boards 74 caught by the bottom of the fitting connection recess portion 57 for preventing detachment of the relay terminal 30. Further, the fixed board portion 72 is formed with a welding portion 75 brought into contact with the lead 69 of the electronic part 29 and welded thereto in integration. A reference 76 designates a through hole inserted to the fixing portion (not shown) of the fitting connection recess portion 57 for positioning.

The tab connecting portion 73 is formed in a box-like shape. Inside of the tab connecting portion 73 is formed with an elastic contact piece (not illustrated) elastically brought into contact with the connection tab 39 of the wire side terminal 26.

In FIG. 1, FIG. 2 and FIG. 7, the ground terminal 31 includes a ground portion 78 comprising a metal having a conductivity and having a through hole 77 for screw fastening, a base portion 79 formed by a shape as a cover for covering an opening portion of the electronic part containing recess portion 56, and a connection leg portion 80 continuous to the base portion 79.

The base portion 79 is provided with the function of the cover as described above and formed with fitting portions 81 and 82 to be caught by the locking projection 61 of the case body 28. Further, the base portion 79 is formed with a clamp attachment and detachment portion 83 for attaching the clamp 32 inserted to and locked by the seat face of the vehicle body. The base portion 79 is formed by a shape of capable of pushing the electronic part 29 after having been contained in the electronic part containing recess portion 56.

The fitting portions 81 and 82 are constituted substantially by a frame-like shape to hang down respectively from side portions of the base portion 79. The fitting portions 81 and 82 are provided with a necessary sufficient flexibility for riding over the locking projections 61 of the case body 28. The clamp attachment and detachment portion 83 is formed in a slit-like shape of notching the base portion 79. The clamp attachment and detachment portion 83 is formed to be able to slide to fix the clamp 32 after inserting the clamp 32. A portion of the clamp attachment and detachment portion 83 for inserting the clamp 32 is consecutively aligned with the fitting portion 82.

The connecting leg portion 80 is a portion inserted to the fitting connection recess portion 57 and is formed such that a strip piece is folded to bend in an L-like shape. The portion of folding to bend the connecting leg portion 80 is formed with a slit 84 to escape the lead 68 of the electronic part 29. Further, a portion thereof in correspondence with the bottom of the fitting connection recess portion 57 is formed with a welding portion 85 in a projected shape brought into contact with and welded to the lead 68.

The clamp 32 is a member made of a synthetic resin, constituted by a structure of being attachable and detachable to and from the ground terminal 31 and a structure inserted to the seat face of the vehicle body to be locked by the portion. The clamp 32 is provided with a function as a locking portion. The clamp 32 includes a base plate 86 in parallel with the base portion 79 of the ground terminal 31, a stay 87 provided at a surface of the base plate 86 and a pair of locking blades 88 having a flexibility and consecutively aligned to the stay 87. The clamp 32 is made to be able to make respective end portions of the locking blades 88 caught by an opening edge of a clamp hole by inserting the pair of locking blades 88 to the clamp hole formed at the seating face of the vehicle body.

In FIG. 2, the electronic part 29 includes a main body 89 and a pair of the leads 68 and 69. Although according to the embodiment, a known capacitor is used for the electronic part 29 for a noise filter, a diode or a resistor may be used in accordance with other use.

In FIG. 1 through FIG. 4, the shortcircuit preventing cover 101 is a member made of an insulating synthetic resin and is formed to be able to cover the bottom wall 58 and the side wall 59 of the case body 28 at the position of the fitting connection recess portion 57. The shortcircuit preventing cover 101 includes a bottom wall opposed portion 104 in a rectangular shape, a side wall opposed portion 105 in a channel-like shape consecutively aligned to three side portions of the bottom wall opposed portion 104, and inserting portions 106, 107 projected from an inner face of the side wall opposed portion 105. The bottom wall opposed portion 104 covers the bottom wall 58 of the case body 28 and the side wall opposed portion 105 in the channel-like shape covers the side wall 59 of the case body 28. Specifically, the bottom wall opposed portion 104 covers the welding holes 102, 103 of the bottom wall 58

(refer to FIG. 4), and the side wall opposed portion 105 in the channel-like shape covers the projection locking portion 62 of the side wall 59.

The inserting portions 106, 107 are formed as portions of being inserted to the fitting connection recess portion 57 by way of the projection locking portion 62 formed at the side wall 59 of the case body 28. The inserting portion 106 is formed to be able to cover the portion of welding the lead 68 of the electronic part 29 and the connection leg portion 80 of the ground terminal 31 while pressing from thereabove. The inserting portion 106 is formed by a shape of a rib having a long length (or a shape of a slender short strip). The inserting portion 106 is provided with a more or less elasticity. In contrast thereto, the inserting portion 107 is formed in a shape of a short projected portion of being only inserted to the projection locking portion 62 formed on the side of the relay terminal 30.

The shortcircuit preventing cover 101 squeezes the welding portion by the inserting portion 106 and the bottom wall opposed portion 104 to be attached thereby. Further, the shortcircuit preventing cover 101 inserts the inserting portion 107 to the projection locking portion 62 to be attached thereto also thereby.

Next, an explanation will be given of integration of the cover attached wire 24, integration of the unit main body 25, integration of the electronic part equipped unit 22, and attachment of the electronic part equipped unit 22 based on the above-described constitution.

With regard to the cover attached wire 24, first, at the middle portion 23 of the wire 21 constituting a desired position, an operation of removing the cover portion of the wire 21 in a predetermined range to expose the conductor and connecting the wire side terminal 26 to the exposed conductor is carried out. Next, an operation of inserting the wire side terminal 26 to inside of the cover member 27 from the side of the bottom portion 35 to lock the wire side terminal 26 is carried out. When the wire side terminal 26 is locked by the cover member 27, the integration with regard to the cover attached wire 24 is finished.

The wire side terminal 26 is contained in the wire containing portion 47 of the cover member 27 and is protected by the cover member 27. The wire 21 is supported by the wire support portion 51 of the cover member 27. The integration of the cover attached wire 24 is finished in the form of maintaining the horizontal state of the wire 21.

With regard to the unit main body 25, first, an operation of containing the main body 89 of the electronic part 29 to the electronic part containing recess portion 56 of the case body 28 and mounting the respective front end sides of the leads 68 and 69 to the bottom of the fitting connection recess portion 57 to position while inserting middle portions of the leads 68 and 69 of the electronic part 29 to the lead support portions 65 and 66 is carried out. Next, the relay terminal 30 and the connecting leg portion 80 of the ground terminal 31 are respectively attached to predetermined positions of the fitting connection recess portion 57. At this occasion, the base portion 79 of the ground terminal 31 is fitted to the case body 28 while covering the electronic part containing recess portion 56 containing the main body 89 of the electronic part 29. Successively, an operation of respectively welding the relay terminal 30 and the connecting leg portion 80 and fixing the respective welding portions 85 and 75 in the projected shape and the leads 68 and 69 is carried out. Thereby, the integrating operation with regard to the unit main body 25 is finished.

After finishing to integrate the cover attached wire 24 and integrating the unit main body 25, first, an operation of fitting the cover attached wire 24 to the fitting connection recess portion 57 of the unit main body 25 and forming an electric connection state simultaneously therewith is carried out. Thereby, integration of a portion having a basic function of the electronic part equipped unit 22 is finished. Next, an operation of providing a shortcircuit preventing function to the electronic part equipped unit 22 is carried out by attaching the shortcircuit preventing cover 101. When the shortcircuit preventing cover 101 is attached, the bottom wall opposed portion 104 of the shortcircuit preventing cover 101 covers the welding holes 102, 103 of the bottom wall 58 of the case body 28, further, the side wall opposed portion 105 in the channel-like shape of the shortcircuit preventing cover 101 covers the projection locking portion 62 of the side wall 59 of the case body 28. Therefore, a portion covered by the shortcircuit preventing cover 101 is shut off from outside. Further, at this occasion, at inside of the fitting connection recess portion 57, the portion of welding the lead 68 of the electronic part 29 and the connection leg portion 80 of the ground terminal 31 is covered and protected by the inserting portion 106 of the shortcircuit preventing cover 101. The operation of integrating the electronic part equipped unit is finished by the above-described.

With regard to attachment of the electronic part equipped unit 22, first, an operation of provisionally fixing the electronic part equipped unit 22 by inserting the clamp 32 to the clamp hole formed at the seating face of the vehicle body is carried out. Next, an operation of positioning the through hole 77 for screw fastening of the ground terminal 31 to the screw hole formed at the seating face and fixing the ground portion 78 of the ground terminal 31 to the seating face by fastening by the screw is carried out. Further, at this occasion, a rotational torque produced in screw fastening is received by the clamp 32 directly fixed to the ground terminal 31. When the ground portion 78 of the ground terminal 31 has been finished to fix, an operation of attaching the electronic part equipped unit 22 is finished.

As explained in reference to FIG. 1 to FIG. 4 as described above, according to the invention, even when the welding holes 102, 103 communicating with inside of the fitting connection recess portion 57 are present in the case body, the welding holes 102, 103 are covered by the shortcircuit preventing cover 101 to be shut off from outside. Therefore, a foreign matter having a conductivity is not brought to the welding holes 102, 103 after attaching the electronic part equipped unit 22, as a result, a drawback of shortcircuit can be prevented from being brought about.

Further, according to the invention, the inserting portion 106 of the shortcircuit preventing cover 101 is inserted to the fitting connection recess portion 57 to cover the portion of welding the lead 68 of the electronic part 29 and the connection leg portion 80 of the ground terminal 31 (connecting portion), and therefore, even when a foreign matter is assumedly mixed to inside of the fitting connection recess portion 57, a drawback owing to the welding portion can be prevented from being brought about.

The invention achieves an advantage of capable of providing the electronic part equipped unit 22 having the shortcircuit preventing function.

The invention can naturally be modified to embody variously within the range of not changing the gist of the invention.

The present application is based on Japan Patent Application No. 2007-182311 filed on Jul. 11, 2008, the contents of which are incorporated herein for reference.

What is claimed is:

1. An electronic part equipped unit, comprising:

a case body that includes a first recess portion for containing an electronic part and a second recess portion for containing a relay terminal and a ground terminal which are connected to the electronic part through a first lead and a second lead, respectively;

a wire side terminal to which a middle portion of a wire is attached;

a cover member to which the wire side terminal is attached; and a short-circuit preventing cover that covers an outside surface of a bottom wall and a side wall of the case body at a position corresponding to the second recess portion, wherein the wire side terminal is brought into contact with the relay terminal when the cover member is fitted to the second recess portion of the case body, the short-circuit preventing cover includes an inserting portion which passes through the side wall of the case body, and covers a connecting portion in which one of the leads is connected to the ground terminal; and a portion of the short-circuit preventing cover opposed to the bottom wall covers a welding hole formed at the bottom wall of the case body.

2. An electronic part equipped unit, comprising:

a case body that includes a first recess portion for containing an electronic part and a second recess portion for containing a relay terminal and a ground terminal which are connected to the electronic part through a first lead and a second lead, respectively;

a wire side terminal to which a middle portion of a wire is attached;

a cover member to which the wire side terminal is attached; and a short-circuit preventing cover that covers an outside surface of a bottom wall and a side wall of the case body at a position corresponding to the second recess portion, wherein the wire side terminal is brought into contact with the relay terminal when the cover member is fitted to the second recess portion of the case body, a locking portion is formed in the side wall of the case body, the short-circuit preventing cover includes an inserting portion which passes through the locking portion, and the inserting portion covers a connecting portion in which the second lead is connected to the ground terminal.

3. An electronic part equipped unit, comprising:

a case body that includes a first recess portion for containing an electronic part and a second recess portion for containing a relay terminal and a ground terminal which are connected to the electronic part through a first lead and a second lead, respectively;

a wire side terminal to which a middle portion of a wire is attached;

a cover member to which the wire side terminal is attached; and a short-circuit preventing cover that covers an outside surface of a bottom wall and a side wall of the case body at a position corresponding to the second recess portion, wherein the wire side terminal is brought into contact with the relay terminal when the cover member is fitted to the second recess portion of the case body, and a portion of the short-circuit preventing cover opposed to the bottom wall covers a welding hole formed at the bottom wall of the case body.

4. An electronic part equipped unit, comprising:

a case body that includes a first recess portion for containing an electronic part and a second recess portion for containing a relay terminal and a ground terminal which are connected to the electronic part through a first lead and a second lead, respectively;

a wire side terminal to which a middle portion of a wire is attached;

a cover member to which the wire side terminal is attached; and a short-circuit preventing cover that covers an outside surface of a bottom wall and a side wall of the case body at a position corresponding to the second recess portion, wherein the wire side terminal is brought into contact with the relay terminal when the cover member is fitted to the second recess portion of the case body, a locking portion is formed in the side wall of the case body, the short-circuit preventing cover includes an inserting portion which passes through the locking portion, and the inserting portion is formed in the shape of a rib.

* * * * *